US012791988B1

(12) United States Patent

Reis et al.

(10) Patent No.: US 12,791,988 B1

(45) Date of Patent: Nov. 10, 2026

(54) BAND FOR EXTENDED CAPABILITY FOR WEARABLE ELECTRONIC DEVICES

(71) Applicant: Higher Ground LLC, Palo Alto, CA (US)

(72) Inventors: Robert S. Reis, Palo Alto, CA (US); Shmuel Shaffer, Palo Alto, CA (US); James M. Behmke, Boston, MA (US)

(73) Assignee: Higher Ground LLC, Palo Alto, CA (US)

( * ) Notice: Subject to any disclaimer, the term of this patent is extended or adjusted under 35 U.S.C. 154(b) by 1042 days.

(21) Appl. No.: 17/898,365

(22) Filed: Aug. 29, 2022

Related U.S. Application Data

(60) Provisional application No. 63/237,750, filed on Aug. 27, 2021.

(51) Int. Cl.

| | |
|---|---|
| ***G04R 60/06*** | (2013.01) |
| ***G04C 10/00*** | (2006.01) |
| ***H01Q 1/27*** | (2006.01) |
| ***H01Q 9/04*** | (2006.01) |
| ***H04B 1/3827*** | (2015.01) |
| ***H04B 7/185*** | (2006.01) |

(52) U.S. Cl.

CPC ............ *G04R 60/06* (2013.01); *G04C 10/00* (2013.01); *H01Q 1/273* (2013.01); *H01Q 9/0407* (2013.01); *H04B 1/385* (2013.01); *H04B 7/1851* (2013.01)

(58) Field of Classification Search

CPC ........ G04R 60/06; G04C 10/00; H01Q 1/273; H01Q 9/0407; H04B 1/385; H04B 7/1851

See application file for complete search history.

(56) References Cited

U.S. PATENT DOCUMENTS

| | | | | |
|---|---|---|---|---|
| 7,463,205 | B2 | 12/2008 | Turner et al. | |
| 9,444,141 | B2 | 9/2016 | Asrani et al. | |
| 9,581,972 | B1 | 2/2017 | Arrow et al. | |
| 10,212,994 | B2 * | 2/2019 | Watterson | A44C 5/027 |
| 10,474,192 | B2 | 11/2019 | Song et al. | |
| 10,607,507 | B2 | 3/2020 | Connor | |
| 10,768,581 | B2 * | 9/2020 | Wang | G04G 17/04 |
| 11,394,215 | B1 * | 7/2022 | Bhagwan | H02J 7/0063 |
| 2014/0378853 | A1 * | 12/2014 | McKinney | A61B 5/02438 600/509 |

(Continued)

FOREIGN PATENT DOCUMENTS

JP 6682808 B2 4/2020

*Primary Examiner* — Junpeng Chen

(74) *Attorney, Agent, or Firm* — Lee & Hayes, P.C.

(57) ABSTRACT

According to one or more of the embodiments herein, systems and techniques are provided for extending the power, circuitry, functionality, and/or communication capability for wrist-wearable electronic devices. For example, certain embodiments herein relate to incorporating various technologies within a watch band for a wristwatch (e.g., a smartwatch) or other wrist-mounted device. In one embodiment, the functionality of the wearable device may be extended by attaching to it additional computing power, sensors, antennas, and/or a powering battery contained within an associated wristband. The attachments may then communicate with the basic wearable device by using a signal bus embedded in the wristband or wirelessly through one or more communication and/or inductive charging protocols.

16 Claims, 14 Drawing Sheets

(56) References Cited

U.S. PATENT DOCUMENTS

| | | | | |
|---|---|---|---|---|
| 2015/0333302 | A1 | 11/2015 | Johns et al. | |
| 2016/0062319 | A1 | 3/2016 | Kim et al. | |
| 2016/0294225 | A1 | 10/2016 | Blum et al. | |
| 2016/0322999 | A1* | 11/2016 | Kim | H01Q 1/36 |
| 2016/0343186 | A1* | 11/2016 | Jun | G07C 9/00563 |
| 2018/0059714 | A1* | 3/2018 | Martin | G06F 1/1635 |
| 2018/0294553 | A1* | 10/2018 | Lim | H01Q 5/35 |
| 2020/0243808 | A1 | 7/2020 | Harutyunyan et al. | |

* cited by examiner

BAND FOR EXTENDED CAPABILITY FOR WEARABLE ELECTRONIC DEVICES

RELATED APPLICATION

This application claims priority to U.S. Prov. Appl. Ser. No. 63/237,750, filed on Aug. 27, 2021, by Robert S. Reis, et al., entitled EXTENDED POWER, CIRCUITRY, AND/OR COMMUNICATION CAPABILITY FOR WRIST-WEARABLE ELECTRONIC DEVICES, the contents of which are incorporated herein by reference.

TECHNICAL FIELD

The present disclosure relates generally to wearable electronic devices, and, more particularly, to systems and methods for extending the power, circuitry, and/or communication capability for such wearable electronic devices.

BACKGROUND

Wrist-wearable electronic devices, such as watches, smartwatches, fitness/health trackers, and so on, are each designed with a certain processing capability, battery power, and communication circuitry that meets their respective needs. Once set and productized, however, this configuration is generally unchangeable. As such, product designers are often faced with providing more capabilities than would be needed by the average user, at added cost, weight, and/or size, or else providing less capability than some users would desire.

For example, with the increased computational power of the wearable devices and the ability to download applications to the wearable devices, the length of time that a wearable device can operate greatly depends upon the amount of energy required to operate particular applications and/or other circuitry invoked on the wearable device, which can vary greatly based on how each individual user utilizes the device.

In addition to power considerations, while downloadable applications may be used to customize the software on smart wearable devices throughout their life, the functionality of wearable devices in general is still limited by their initial physical design. For instance, some electronic devices may include various sensors, such as those that touch the skin of the user to facilitate biomedical measurements or otherwise, as well as other capabilities. However, certain other devices do not have such sensors, and new sensors as well as other technologies are continually being developed.

SUMMARY

According to one or more of the embodiments herein, systems and techniques are provided for extending the power, circuitry, and/or communication capability for wrist-wearable electronic devices. For example, certain embodiments herein relate to incorporating various technologies within a watch band for a wristwatch (e.g., a smartwatch) or other wrist-mounted device.

In one embodiment, the functionality of the wearable device may be extended by attaching to it additional computing power, sensors, antennas, and/or a powering battery contained within an associated wristband. The attachments may then communicate with the basic wearable device by using a signal bus embedded in the wristband or wirelessly through one or more communication and/or inductive charging protocols.

In accordance with one particular embodiment of the present disclosure, the functionality of the wearable device is extended to provide communication, e.g., satellite communication. The antennas of the communication device and/or components of the receiver can then be attached to the central processing unit (CPU) of the wearable device using a signal bus embedded in the wristband in one embodiment, while in another embodiment the connection between the antennas and receiver to the wearable device is wireless.

In accordance with another particular embodiment of the present disclosure, a sensor, such as a heart pulse monitor, blood sugar monitor, blood pressure monitor, blood oxygen level monitor, etc., can be attached to the wristband and configured to communicate with the CPU of the wearable device, such as by using the signal bus embedded in the wristband or else wirelessly.

In accordance with yet another particular embodiment of the present disclosure, the computing power of the wearable device may be extended by attaching a computing device, e.g., CPU, graphical processing unit (GPU), digital signal processor (DSP), etc. to the wearable device using the signal bus embedded in the wristband, or optionally wirelessly in certain embodiments.

In accordance with still another particular embodiment of the present disclosure, in addition to or alternatively to extending the functionality of the device, the battery life of the wearable device may be extended by using the wristband and the signal bus (or inductive charging technology) to attach an external battery to the device. In certain example implementations, the wearable device includes sensors that need to be able to connect either directly or indirectly to the skin of the user, and one or more design considerations and/or accessories for the external battery are contained herein to address the needs of such sensors.

Other embodiments of the present disclosure may be discussed in the detailed description below, and the summary above is not meant to be limiting to the scope of the invention herein.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Figure 1:
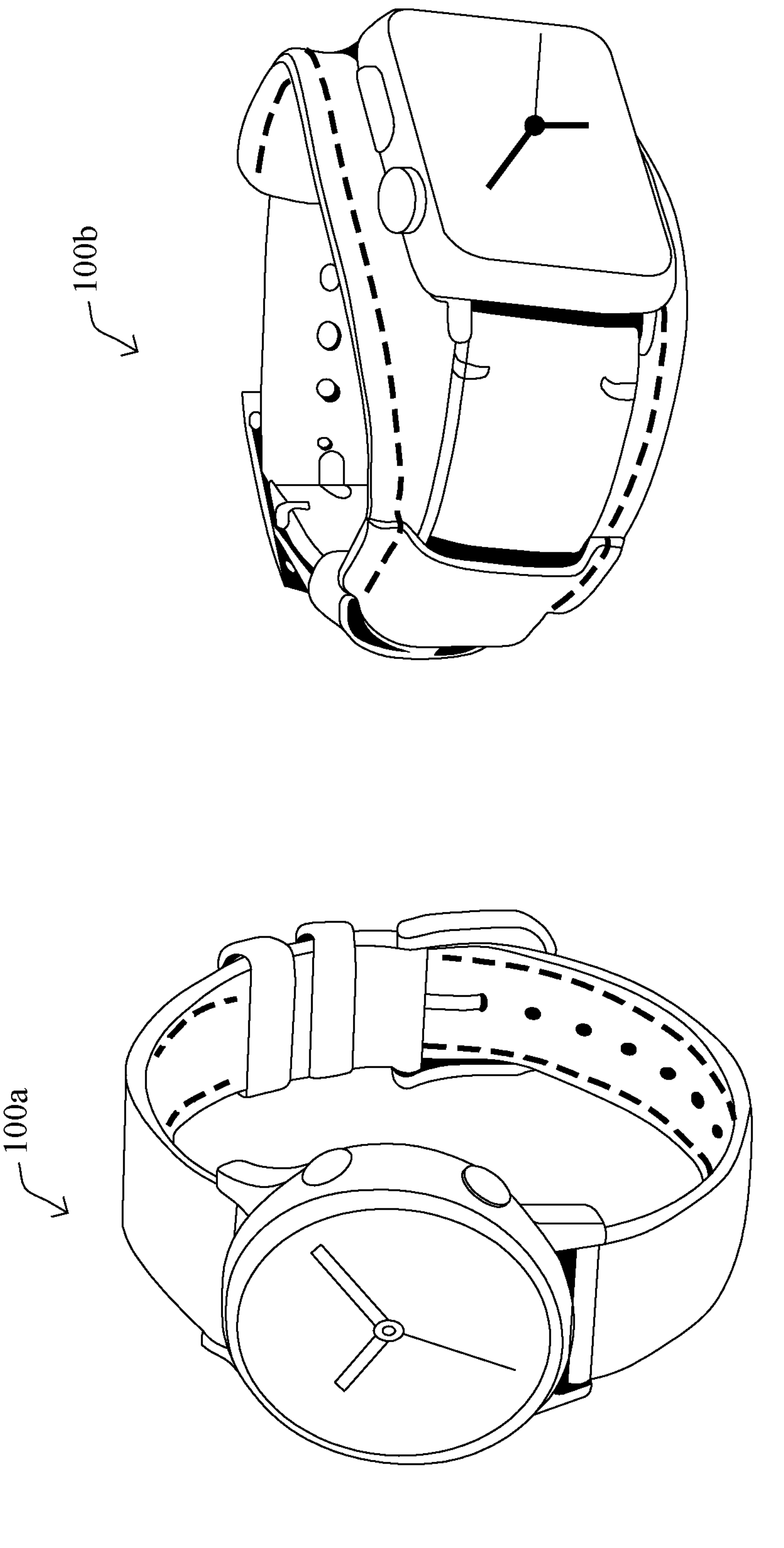
FIG. 1 illustrates an example perspective view of a wearable device.

Reference will now be made in detail to example embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

A wearable device, such as a watch, smartwatch, phone, health/fitness device, or any other wearable device typically includes an internal central processing unit (CPU), display, a battery, and a band that attaches it to the wrist of the user (i.e., a wristband). As noted above, however, the capabilities of such modular wrist-wearable electronic devices (e.g., processing power, battery power, communication circuitry, sensor capabilities, etc.) are limited in terms of extension and improvement once the wearable device is produced.

For example, recent advances in communication, and specifically in satellite communication, allow for more portable satellite communication devices with smaller form factors overall. However, the large power requirements associated therewith may greatly reduce the operational time of the device when it has minimal battery capability, which is most often limited by the size of the device itself, particularly for wearable devices, and thus the available size for the associated battery. An alternative approach is to preconfigure such wearable devices to include a battery that is large and heavy to ensure that the wearable device can operate for the length of time and at the desired power levels as dictated by those users who need it to operate for the longest time, but this results in too large/heavy a battery for the many users who do not need such capacity. (The size of the battery, and especially the power storage capacity of the battery, as well as the operational power of the wearable device and any associated accessories determine the length of time the device can maintain a non-stop operation.)

Similarly, users may utilize different functions of a wearable device at different times. For example, a user may use the wearable as a time piece daily, but may need to use the other functionality(ies), e.g., satellite communications, only occasionally, such as when hiking away from a cellular network. As such, the user may benefit from a modular system that facilitates attaching new modules and facilitating new functionality, e.g., additional power, satellite communications, etc., only when it is needed, and avoiding carrying on a daily basis the extra weight that the additional functionality commands.

The techniques herein, therefore, provide a mechanism for flexibly increasing the available power for wearable devices that may execute an application and/or technology which is a large power consumer, without requiring an increase in the battery capacity of all similarly produced wearable devices regardless of whether they also run such applications. That is, certain particular embodiments of the techniques herein provide a power supply for wearable devices such that the basic device may be smaller and lighter while enabling users to extend the life of their wearable device when longer operational time and/or higher power is required.

The techniques herein also provide a mechanism to increase the functionality and capabilities of the wearable devices by flexibly adding one or more peripheral components and/or circuits, such as through a wristband, where the peripherals add particular configured capabilities to the wearable device through a physical signal bus and/or a wireless communication protocol. Such peripherals may comprise, among other things, a satellite antenna and/or transceiver (transmitter/receiver), biometric sensors, memory storage, processing power, and so on, in addition to, or separately from, the extended battery configuration noted above.

Notably, a wearable device offers a variety of different features and applications that make the wearable device attractive to users. In particular, with the development of operating systems for wearable devices such as Android Wear OS, Apple WatchOS, Xiaomi wearables, Fitbit OS, Garmin OS, and numerous other OSs, new and innovative applications can run on wearable devices. However, these different features and applications offered by smartwatches may require differing amounts of processing and power, which can drain the battery life of the rechargeable battery and diminish the user's ability to use the wearable device or some features of the device as they desire without recharging the battery. The amount of power that can be produced by a battery can be based on the volume of the battery itself. Accordingly, the amount of power producible by batteries that are housed within the watch body is limited by the space available in the watch body.

According to one or more embodiments described herein, therefore, a modular watch band for a wearable device secures the smartwatch to a user's wrist and facilitates the addition of an external battery that accommodates increased power requirements of devices that run power-hungry applications, while freeing users who do not require additional power to run their more power-nimble applications from carrying heavy power supply batteries.

FIG. 1 illustrates examples of wearable devices 100, such as a circular wearable watch 100*a* with a standard wristband and a more rectangular wearable watch 100*b* with a cuffed wristband. Other wrist-worn wearable devices may also be used herein, and the embodiments of the present disclosure are not limited to watches or smart watches, in particular.

Figure 2:
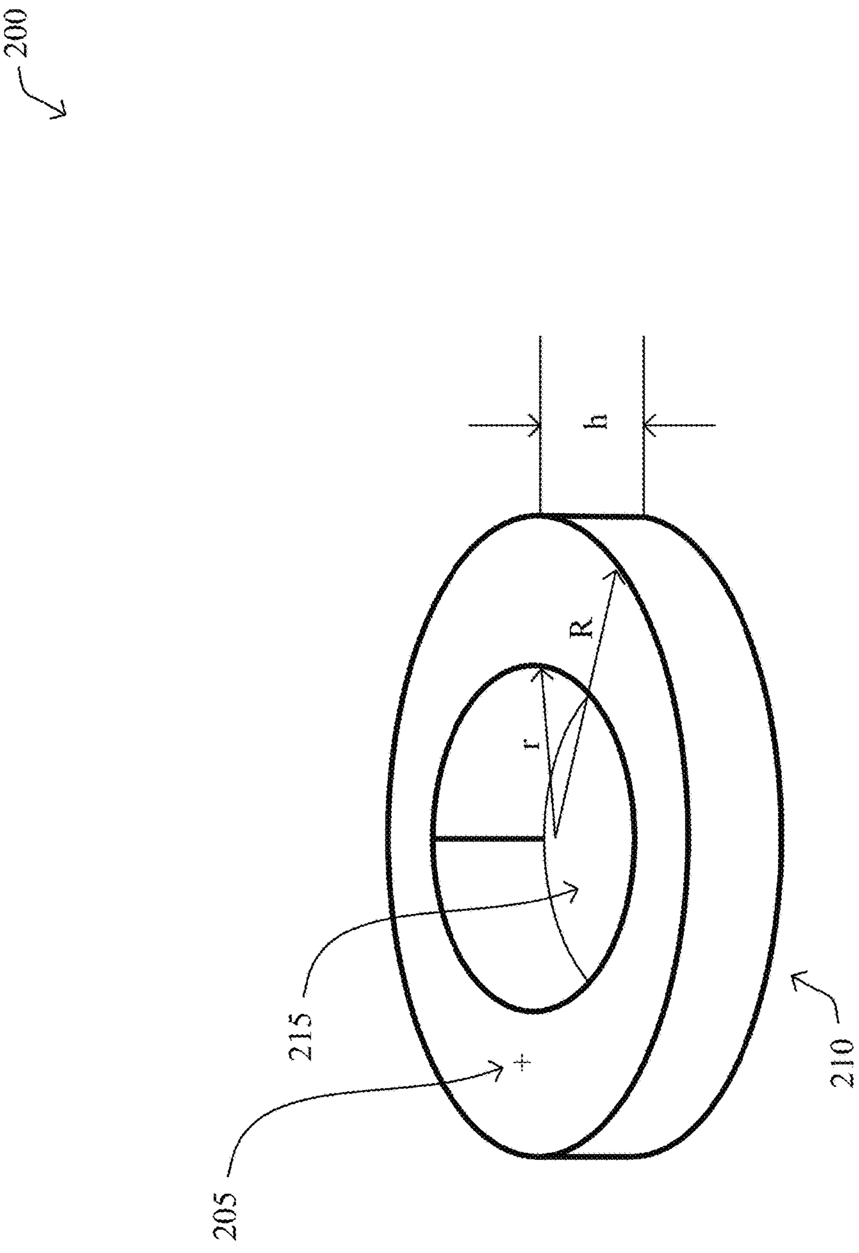
FIG. 2 illustrates an example perspective view of a power extending battery with sensory information accommodation.

According to one or more embodiments herein, FIG. 2 illustrates a battery extension 200 shaped as a ring. Given the fact that the power of the battery is governed by the volume of the battery, the example round battery has the volume of:

$$\text{Volume}=h*\pi*(R^2-r^2) \quad \text{Eq. 1;}$$

where:

h=thickness of the battery;

R=external radius of the battery; and r=radius of the inner aperture (hole) of the battery.

It should be noted that since the volume of the battery depends of the difference ($R^2-r^2$), where the radiuses are squared, the impact of the inner aperture on the overall volume of the battery is rather minimal.

The purpose of the inner aperture 215 is to facilitate passing of biometric sensory data such as temperature, heartbeat, optical coupling, etc., between the skin of the user and the wearable device.

The surface 205 illustrates the positive cathode of the battery and the bottom surface 210 illustrates the negative anode of the battery. The aperture 215 illustrates a passage that as explained in greater details below, enables conveying of biometric information from the skin of the user to the wearable device. In certain instances, the thickness "h" of the battery 200 may permit sensors on the associated wearable device to still accurately achieve their desired sensing. However, in other instances, the sensors may need a more direct/consistent contact with the user's skin.

Note that in certain embodiment, the battery 200 may also comprise one or more flexible batteries or battery components and/or connections. Such flexibility allows the battery 200 to more adequately conform to the rounded shape of the user's wrist. In still further embodiments, two separate semi-circular or otherwise portioned battery sections may be combined to create the desired shape, such as being hinged, separated (and optionally contained within an outer casing), and so on, and the singular component and design of the battery 200 as shown in the figures is merely an example implementation.

Figure 3:
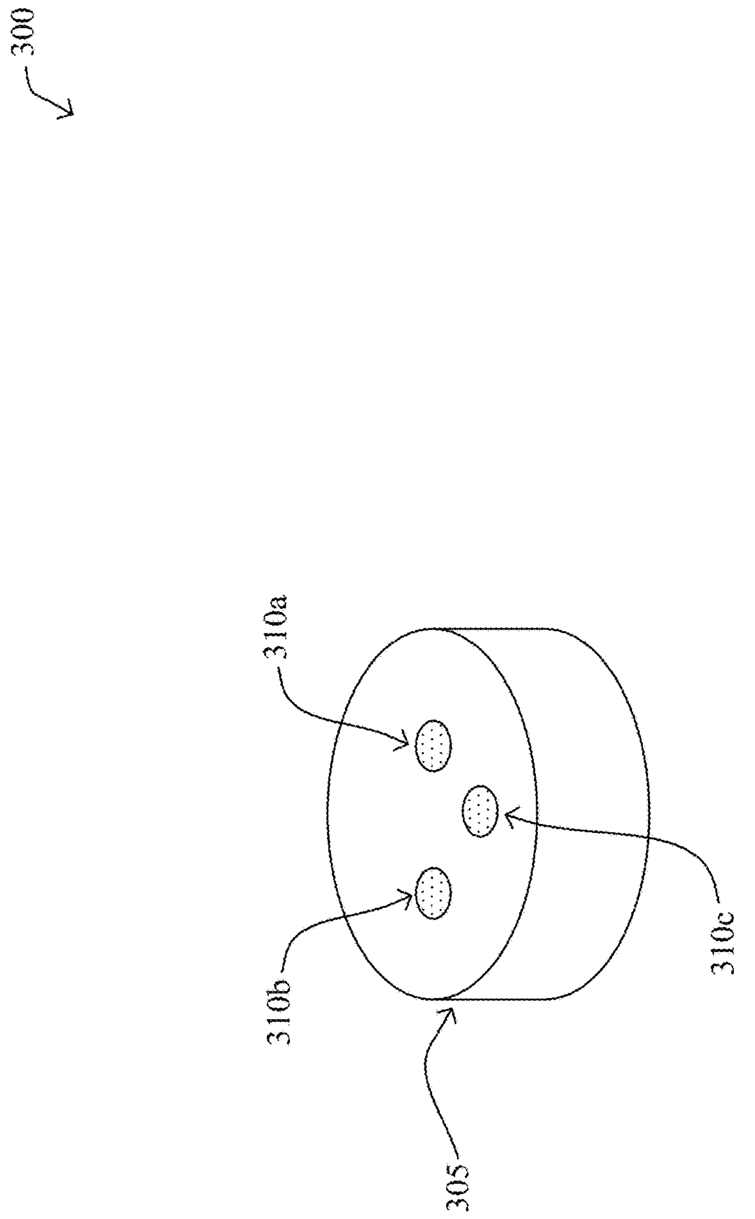
FIG. 3 illustrates an example perspective view of a battery insert that facilitates conveying sensory information.

Accordingly, FIG. 3 shows a perspective view of an illustrative battery insert 300 herein that facilitates conveying sensory information from the skin of the user to a wearable device. The insert 305 has substantially the same thickness as the battery 200 and is designed to fit within the inner aperture 215 of the battery. Biometric sensory conveyers 310*a-c* are spaced and positioned accordingly to match the locations of the sensors at the bottom of the wearable device.

The sensory conveyers 310*a-c* are also designed specifically to match the functionality of the sensor they act to extend. For example, and without limitation, sensory conveyer 310*a* may be a heat conducting element that is designed to convey the temperature of the users to the respective heat sensor at the bottom of the wearable device. Sensory conveyer 310*b*, on the other hand, may be a motion conducting element that is designed to convey the heartbeat of the users to the respective heartbeat sensor at the bottom of the wearable device. Sensory conveyer 310*c*, also, may be an optical conducting element that is designed to convey the image of the users' skin to the respective sensor (e.g., sweat sensor) at the bottom of the wearable device. Note, too, that the optical conducting element may also permit passage of light from infrared and/or visible-light light-emitting diodes (LEDs) in one direction, and reception of returned light from the user's skin to photosensors in the other direction. Also note that while a certain number and configuration of sensory conveyers 310*a-c* are shown and described, any number of sensory conveyers may be used, including a plurality of the same type of sensory conveyer in different locations, and so on.

Note that for the sake of simplicity the inner aperture of the battery as well as the outer shape of the battery insert are illustrated as a perfect circle. However, those skilled in the art should realize that the both the inner aperture and the outer shape of the insert may, and usually do, contain a specific feature that ensures that the sensory conveyers 310*a-c* are in a position that matches the positions of the associated sensors under the wearable device.

Figure 4:
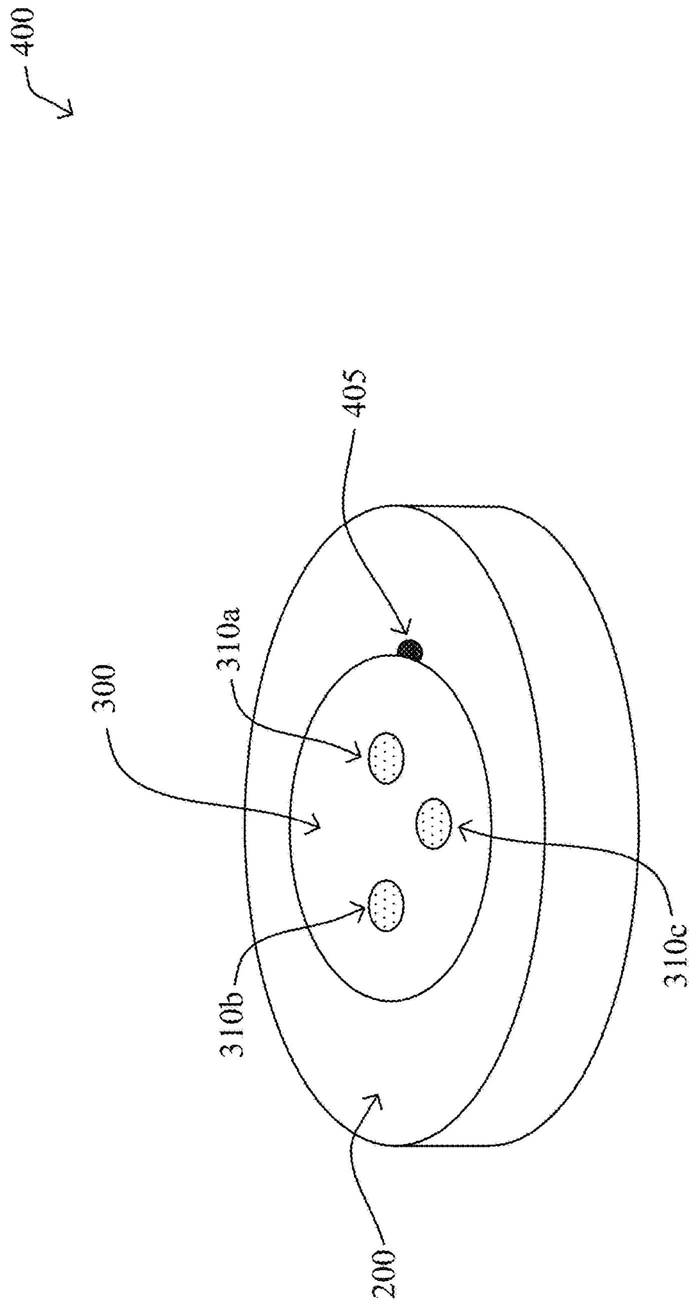
FIG. 4 illustrates an example perspective view of a battery insert within a battery.

For example, FIG. 4 shows a perspective view of a system 400 comprising the battery insert 300 within a battery 200, where a key 405 ensures that the sensory conduits (sensory conveyers 310*a-c*) are aligned properly with the battery (which as described below is aligned with the band and the watch) as to facilitate biometric measurements by the wearable device.

While the illustrations above describe the battery as having a shape of a ring, those skilled in the art should recognize that the invention covers also square battery configurations as well as any other configuration that matches the shape of the wearable device, and particularly, in certain embodiments, that facilitates conveying the biometric information to from the skin of the user to the wearable device.

Figure 5:
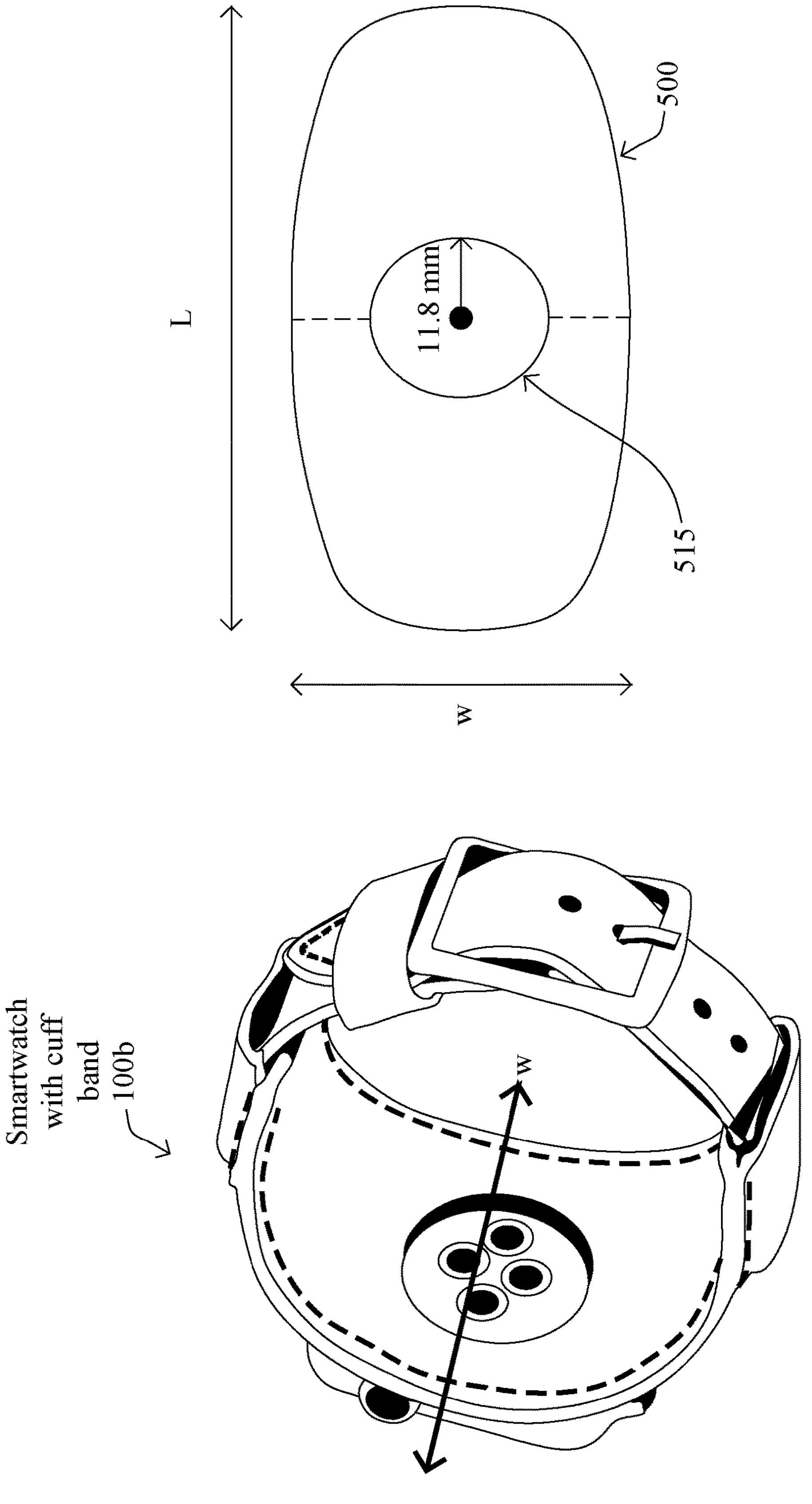
FIG. 5 illustrates an alternative configuration of a power extending battery with sensory information accommodation.

For instance, FIG. 5 illustrates an alternative design for a battery 500 according to the techniques herein, such as for a wearable device 100*b* (e.g., smartwatch) with an associated cuff band. In this instance, the battery may be longer than it is wide, and generally more rectangular (or more oval) in design, offering greater battery volume and thus capacity/power. Any suitable design/shape may be made, with the same provisions of having an aperture 515 to support functionality of one or more sensors associated with the wearable device as described above, and the shape of the battery may be configured based on fit, form, and aesthetics, otherwise.

Figure 6:
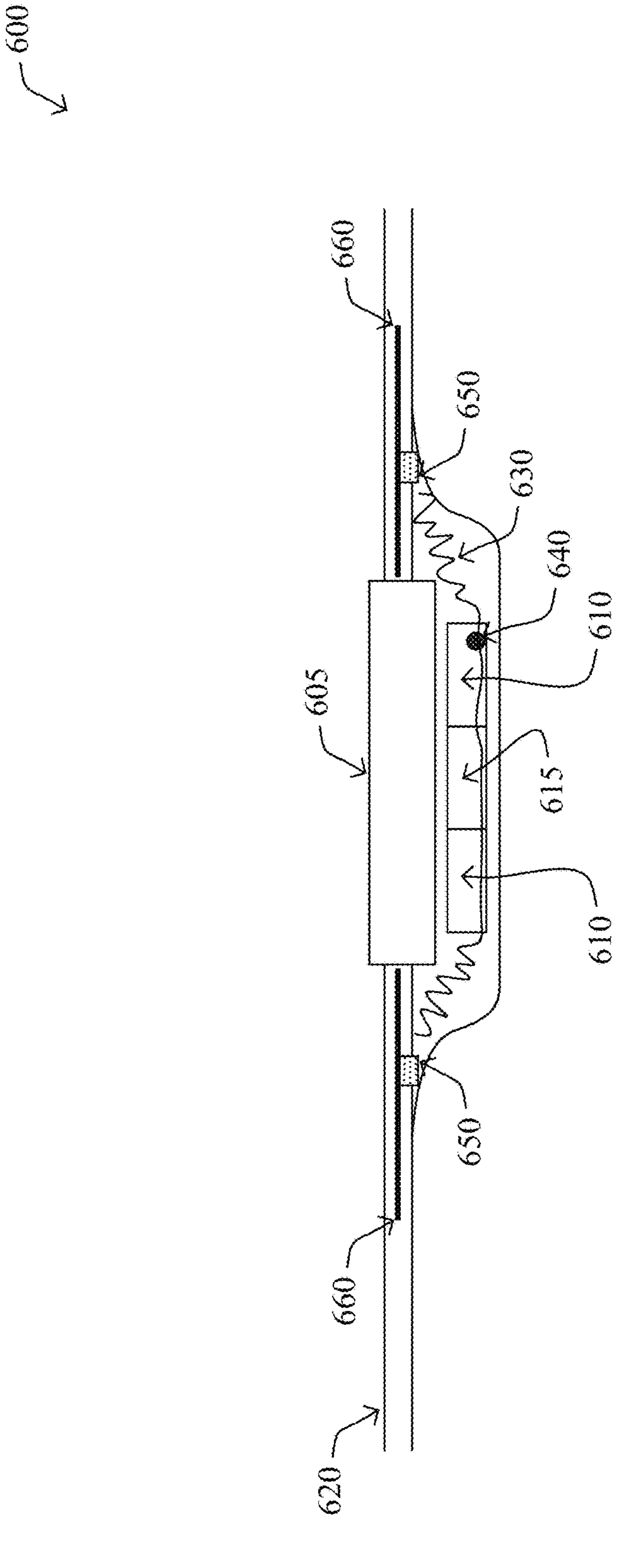
FIG. 6 illustrates an example perspective view of a peripheral, e.g., a battery, attached to the bottom of the wearable device.

FIG. 6 shows a perspective view 600 of a battery attached to the wearable device. Illustratively, the wearable device 605 is attached to the user's wrist using wristband 620. For sake of simplicity, a fastening mechanism (e.g., a buckle or a folding clasp) that secures the wearable device around the user is not shown (or alternatively, the ends of a closed loop, such as with elastic bands). When a large power-consuming application is downloaded to the wearable device, an external battery may be required to secure a reasonable operation period for the device. When such a need is identified, an external battery, such as the ring battery 610, may be used. The battery is inserted into a battery holder 630 which in one example implementation may use a guiding fixture such as fixture 640 to ensure that the battery is oriented in a predetermined orientation. Aligning the battery in a specific orientation ensures that the biometric sensory information conduits would align with the sensors of the wearable device. The inner insert 615 is similar to the inner insert 305 of FIG. 3 above and is used to house the biometric sensory information (sensory conveyers 310).

Other configurations such as positioning the sensors of the wearable device in a circular configuration, while not shown in the figure, are covered as well by the present disclosure. Also, for the sake of simplifying the illustration, the connection of the anode and cathode of the battery to a connector that facilitates providing power from the battery to the wearable device is not shown.

In one embodiment, the battery and its enclosure may be attached/snapped to the wristband 620 using snapping connectors 650. The snapping connectors may further contain electrical connectors which in addition to securing a physical connectivity also provide electrical connectivity of the battery to the wristband via embedded signal bus 660.

Though FIG. 6 was described with respect to the peripheral attached device being a battery, any other electrical functionality can be used and attached to the wristband. Note, too, that the battery is shown as powering the wearable device. However, in certain embodiments herein, the battery only (or additionally) powers one or more other attachable peripherals, such as sensors, communicators, and so on. As described herein, such additional peripherals may communicate with the wearable device through a signal bus, or through an appropriate wireless communication protocol. In still further embodiments, the wristband herein is a stand-alone device, and merely physically attaches to the wearable device for convenience rather than function.

Figure 7:
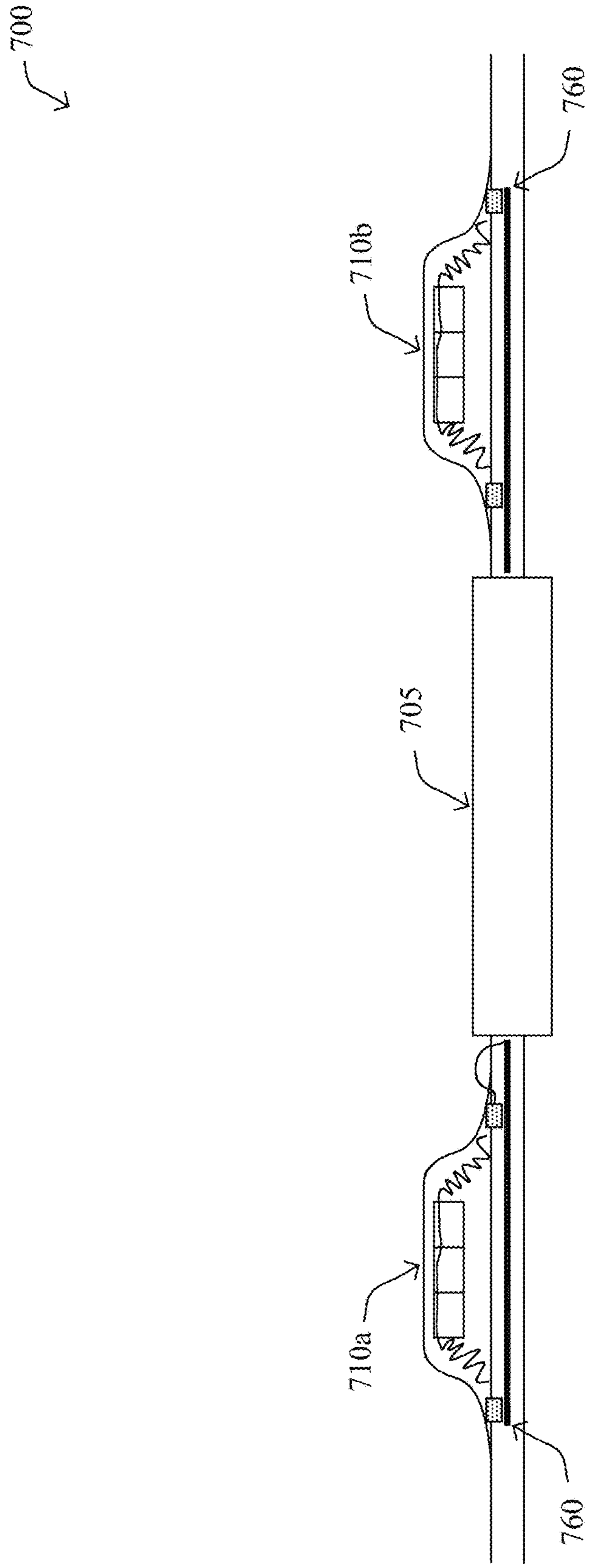
FIG. 7 illustrates an example perspective view of a peripheral attached to the top of the wristband.

FIG. 7 shows a perspective view 700 of one or more peripherals 710*a* and 710*b* attached to the wearable device via a wristband. For instance, the wearable device 705 may be attached to the user's wrist using wristband 720 (where, again, for the sake of simplicity, a buckle or a folding clasp that secures the wearable device is not shown). Peripheral attachments 710*a* and 710*b* illustratively attach to the top of the wristband, such as through a snapping connector such as the connector 650 shown with respect to FIG. 6, or else other mechanism, including permanent attachment connectors, where the connection may contain electrical connectors provide electrical connectivity of peripheral attachments 710*a-b* to the wristband embedded signal bus 760. (Again, alternatively, a communicative connection with the wearable device may be made wirelessly.)

Figure 8:
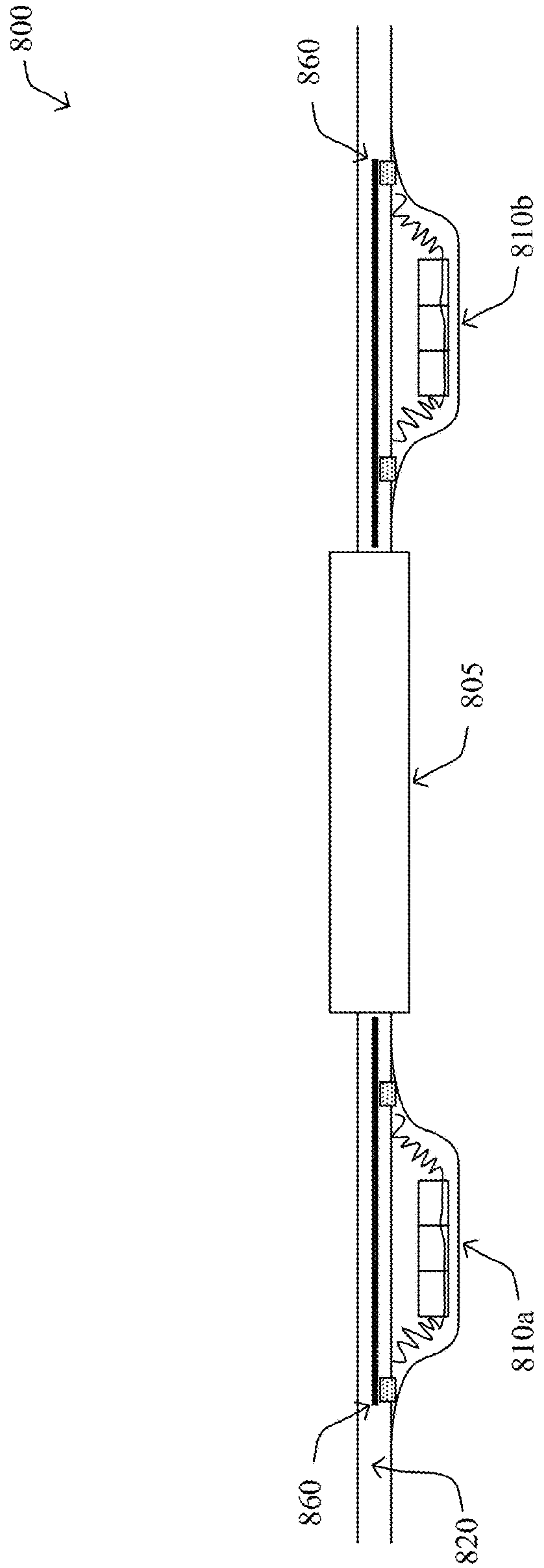
FIG. 8 illustrates an example perspective view of a peripheral attached to the bottom of the wristband.

Alternatively, FIG. 8 shows a perspective view 800 of peripherals 810*a* and 810*b* attached to the wearable device 805, which is attached to the user's wrist using band 820. Here, peripheral attachments 810*a* and 810*b* attach below the wristband using a snapping connector such as the connector (e.g., connector 650 shown with respect to FIG. 6), or other mechanisms, including permanent attachment to the band. According to one or more embodiments herein, the connection may contain electrical connectors provide electrical connectivity of peripheral attachments 810*a-b* to the wristband embedded signal bus 860, or alternatively, a communicative connection with the wearable device may be made wirelessly.

Figure 9:
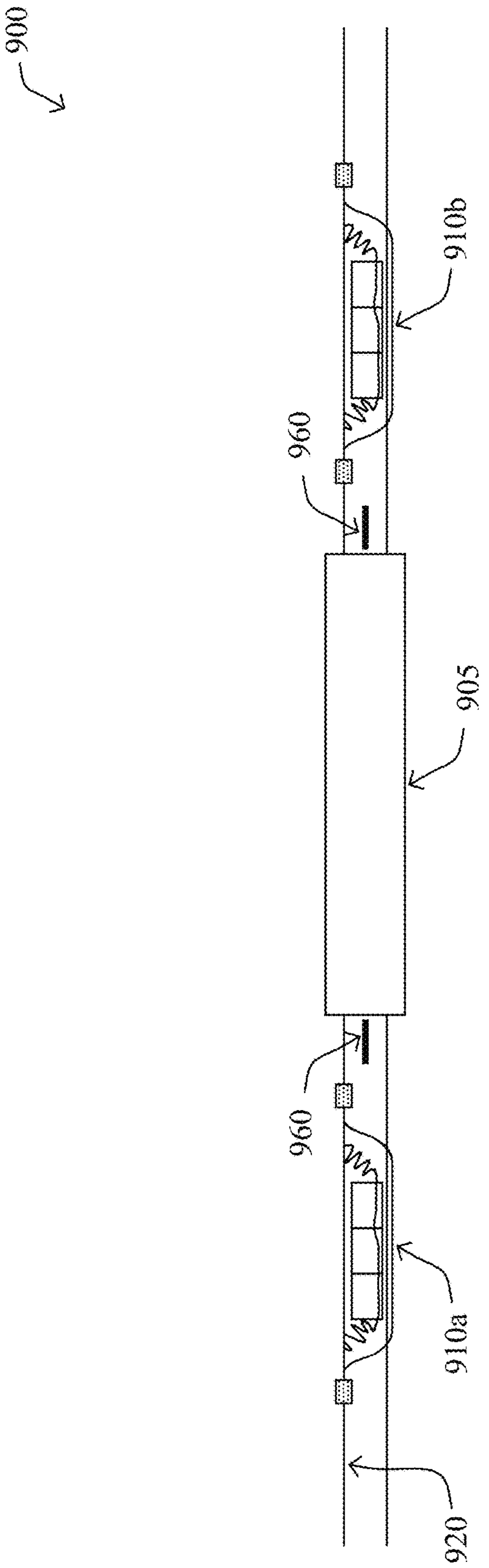
FIG. 9 illustrates an example a perspective view of a peripheral embedded within the wristband.

As still another example, FIG. 9 shows a perspective view 900 of peripherals 910*a* and 910*b* attached to the wearable device 905, which is attached to the user's wrist using band 920, where peripheral attachments 910*a* and 910*b* are contained within the wristband (internally mounted), and where the connection to the wearable device may be based on the embedded signal bus 960, or alternatively, via a wireless connection.

In accordance with one example implementation, the peripheral attached is an antenna that facilitates communications, such as e.g., satellite communication. In accordance with yet another example implementation, the attached peripheral is a receiver/transmitter modem module that enhances the functionality of the wearable device by providing communication capabilities that exploit (enhance the functionality of) the computation power of the inner processor of the wearable device. In either case, the peripheral may be connected within the wristband signal bus as described above, or wirelessly through one or more wireless communication protocols. Also, in certain embodiments, a snapping connector may also ensure signal connectivity to the wristband signal bus, thus facilitating communication, e.g., satellite communications.

Figure 10:
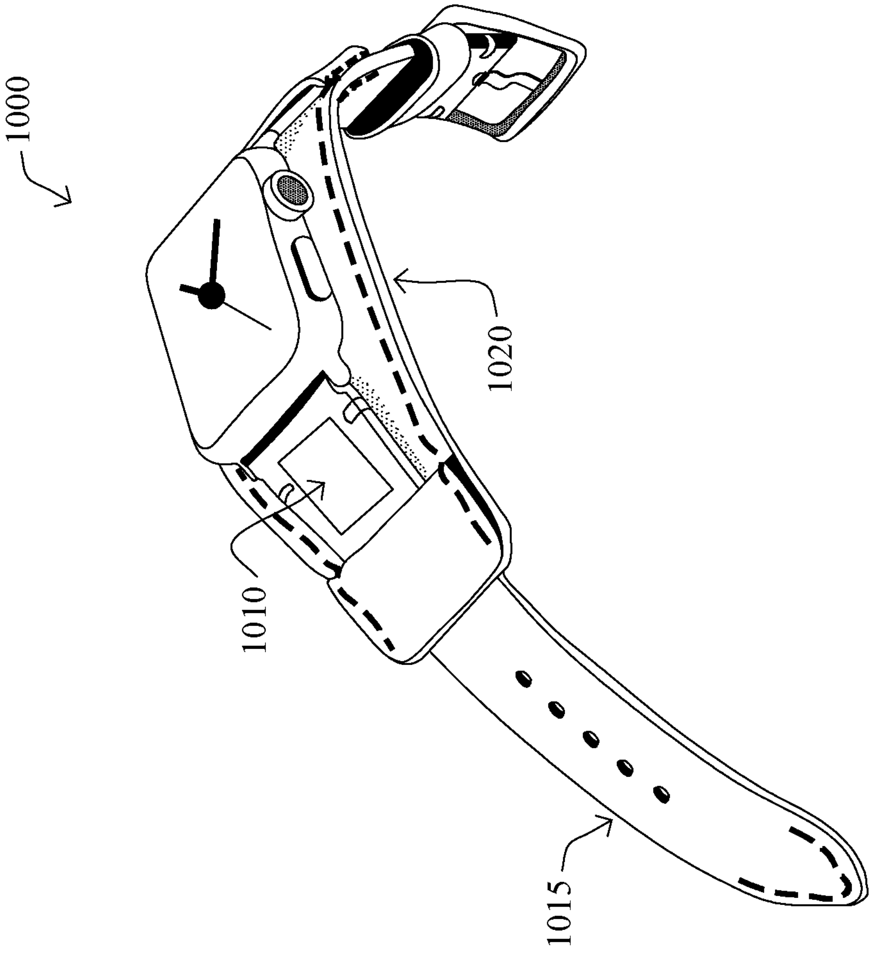
FIG. 10 illustrates an example of a wristband-based satellite communicator for a wearable device.

As shown in FIG. 10, for example, a wearable device 1000 (e.g., smartwatch) may use a wristband 1015 according to the techniques herein, where one or more peripherals may include a satellite antenna module 1010 and a separate battery 1020 (e.g., as described above with appropriate sensor aperture, as needed) to power the antenna module and/or the wearable device 1000.

Figure 11:
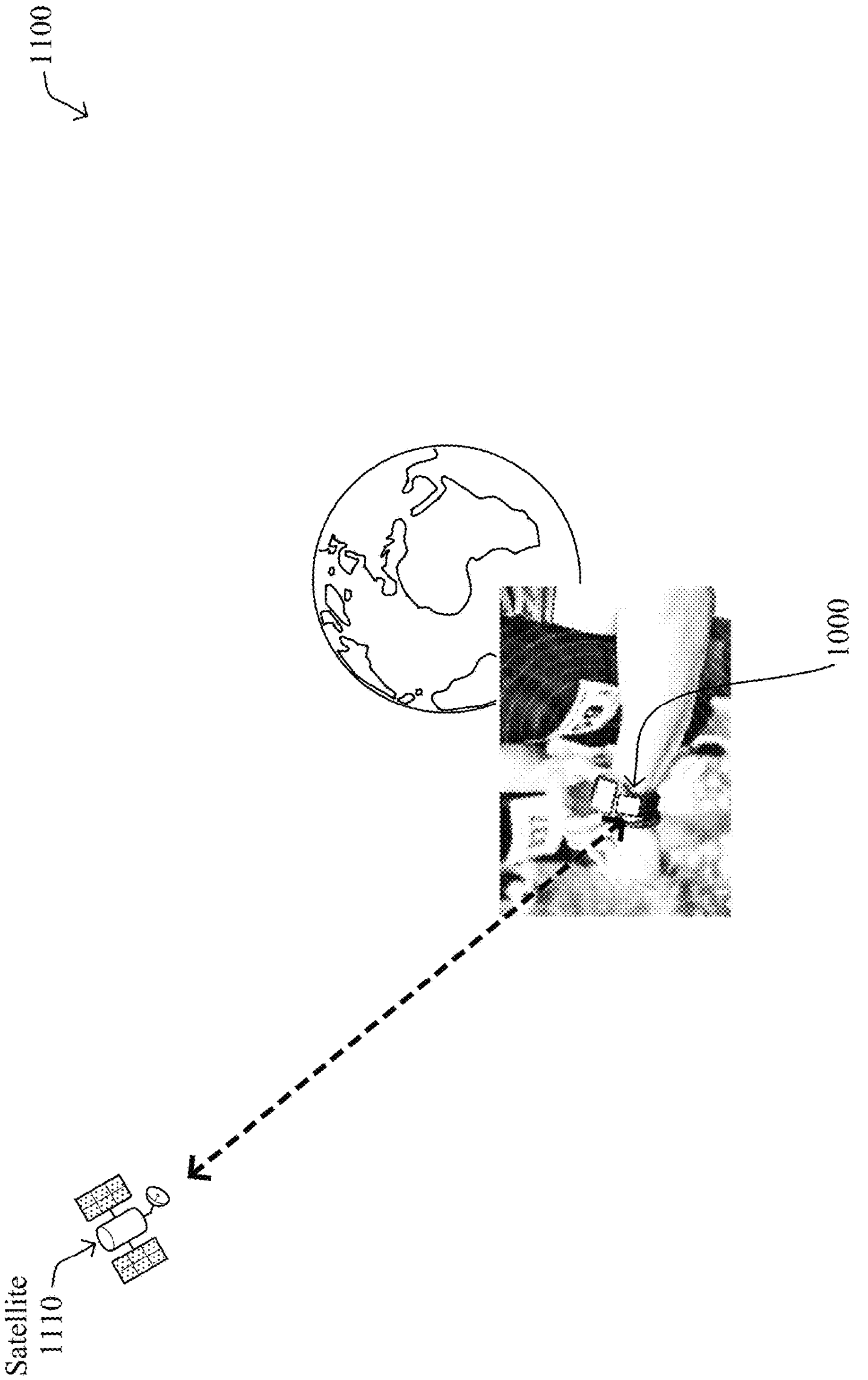
FIG. 11 illustrates an example use of a wristband-based satellite communicator for a wearable device.

In this specific embodiment, for example, as shown in illustrative environment 1100 of FIG. 11, incorporating satellite technology, signal processing, and smartwatch performance into a single device or aggregate system (wearable device 1000) permits wrist-enabled texting from anywhere in the world to a system of communication satellites 1110, regardless of a nearby cellular or WiFi network. That is, by using satellites 1110 (e.g., GEO, MEO, or LEO satellites), a high-performance antenna and radio can now be integrated completely within the wristband of a wearable device 1000, where corresponding smartwatch-enabled user interfaces (e.g., voice-to-text) permits the user to simply speak into the watch to generate the message (or type), and conversations (one-to-one or workgroup) can be displayed and/or reviewed on the high-resolution watch display.

Figure 12:
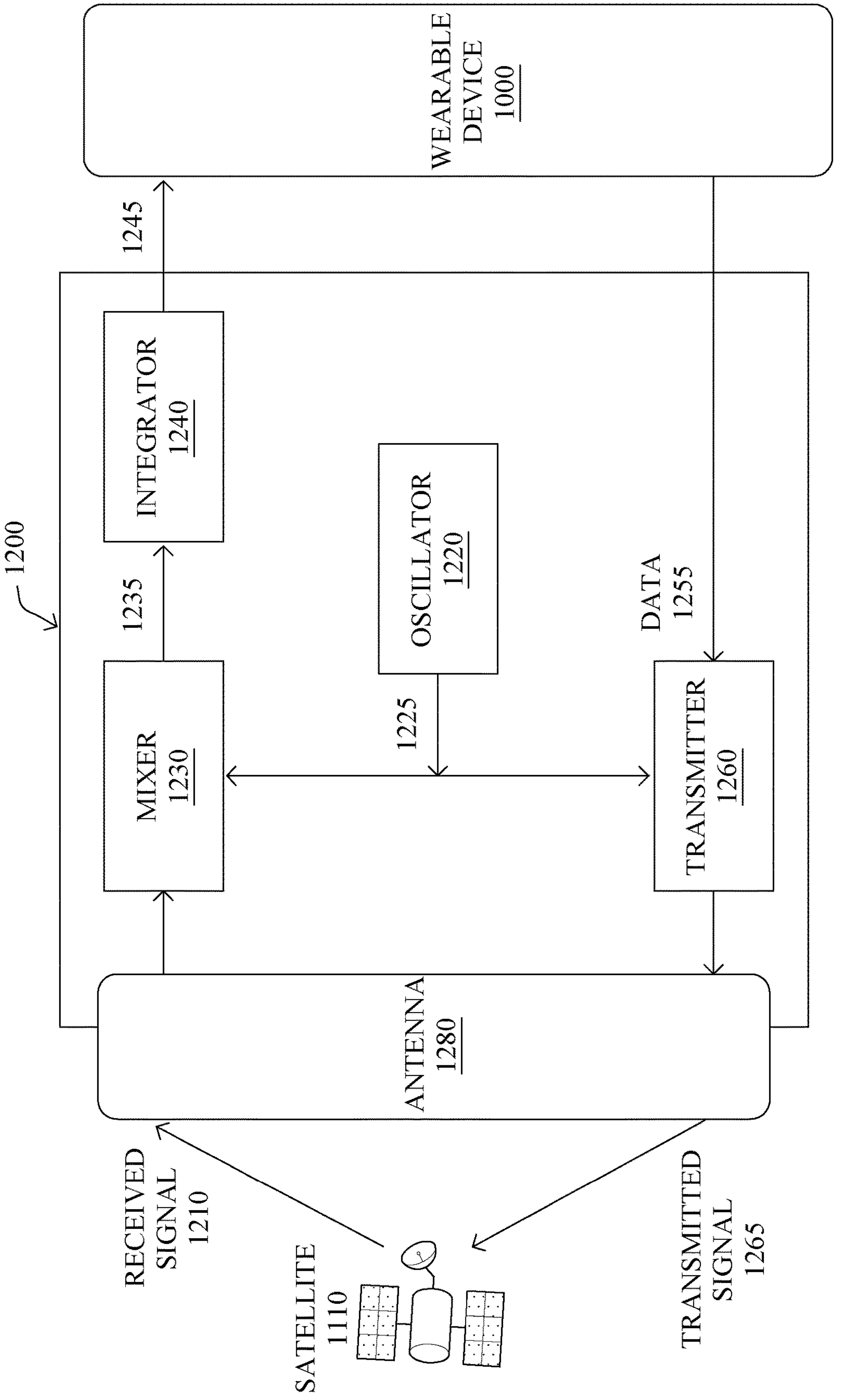
FIG. 12 illustrates an example of a transmitter/receiver associated with the wristband-based satellite communicator for a wearable device.

Regarding the specific circuitry of the peripheral 1010, now referring to FIG. 12, a simplified block diagram of an example illustrative transmitter/receiver 1200 described. When the wearable device 1000 device transmits data 1255 (via a signal bus or wirelessly, as described above), the transmitter 1260 uses the signal 1225 from the oscillator 1220 to modulate the data 1255 and transmit it as signal 1265 via antenna 1280 towards the satellite 1110. For example, for communication over C band, a single 22×25 mm antenna patch can provide a gain of 6 dBi. Alternatively a 46×56 mm quad antenna patch can provide a gain of 12 dBi. Similarly, for communication over Ku band, a single 16×18 mm antenna patch can provide a gain of 6 dBi. Alternatively a 28×30 mm quad antenna patch can provide a gain of 12 dBi.

The wearable device (the transmitter/receiver 1200) receives signals 1210 from the satellite, and mixes it in the mixer 1230 along with the signal 1225 from the oscillator 1220. The resulting signal 1235, however, may be too weak to be detected. Therefore the weak signal 1235 may be fed into the integrator 1240 which attempts to enhance the output signal 1245 back to the wearable device by integrating it over a longer time period. (Alternatively, signal integration may be performed by the wearable device.) Note that in certain embodiments, one or more signal processing components may be performed by the wearable device, where the raw data to be transmitted and/or as received may be passed from/to the wearable device, accordingly. In other words, the peripheral may be a fully participating signal processing device (optionally also including positioning and/or orientation determinations), or may simply be a passive antenna circuitry. (That is, the peripheral may be a module of an antenna only or a combination of an antenna and a downconverter and other circuitry.)

Figure 13A:
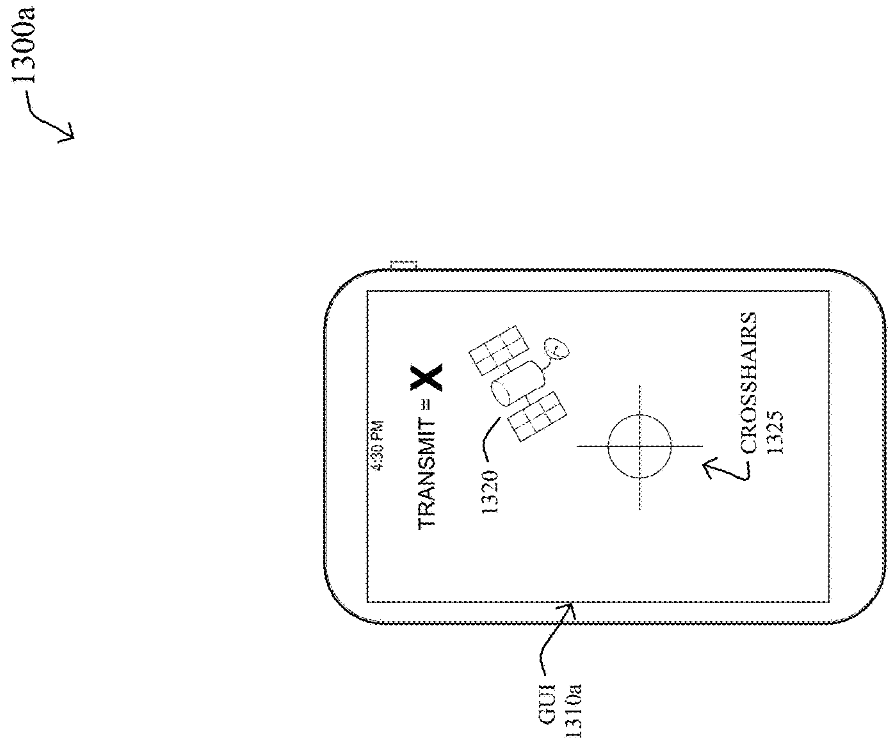
FIGS. 13A-13B illustrate examples of a graphical user interface (GUI) for use with a wristband-based satellite communicator for a wearable device.
Figure 13B:
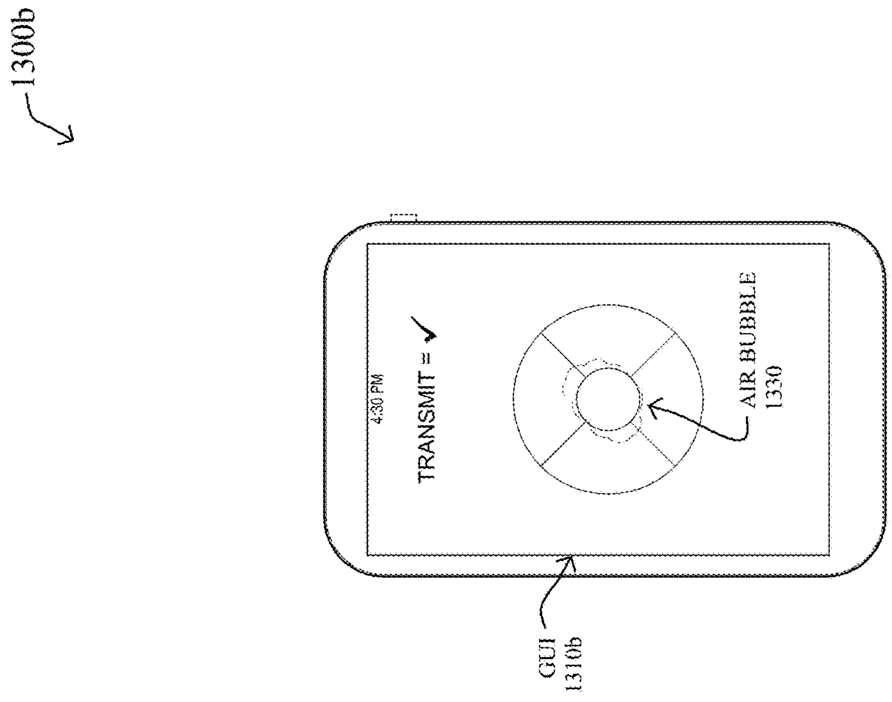

According to the techniques herein, and as shown in FIGS. 13A-13B, the pointing process of the antenna 1280 may be as simple as moving one's wrist until an icon is positioned within a target orientation (using internal sensors of the wearable device/watch or of the peripheral/antenna). For instance, FIGS. 13A-13B illustrate examples of a GUI that may be used according to the techniques described above, particularly for user-based control of the directional antenna. In particular, FIG. 13A illustrates a first wearable device 1300*a* with an example augmented reality (AR) like GUI display 1310*a* with an AR satellite 1320 and stationary "crosshairs" 1325 to aim at the satellite, thus representing the desired direction to point the wearable device (whether the satellite is actually located in that direction, or whether that merely represents the desired "aim" of the mobile device to direct the transmission or reception by the directional antenna according to the desired communication parameters). As shown, the wearable device is not pointing in the proper direction (i.e., the moving AR satellite 1320 is not within the crosshairs 1325 of the GUI 1310*a*), and thus the wearable device should not (or in certain instances, cannot) transmit, or may not be able to receive the desired signals from the intended satellite. Alternatively, FIG. 13B illustrates an example wearable device 1300*b* with an "air bubble" 1330 on GUI display 1310*b* to guide a user to point the device to the desired angle. As shown in FIG. 13B, the illustrative air bubble 1330 is "level", and as such, the wearable device (or more specifically, the antenna peripheral) is appropriately aimed, and transmission and/or reception may commence. Many other types of GUIs and functionalities may be conceived, and those shown herein are not meant to be limiting to the scope of the present disclosure.

Notably, according to one or more embodiments of the present disclosure, the orientation of the antenna peripheral (shown as peripheral 1010 in FIG. 10 above) may be set/fixed with relation to the wearable device, such that orientation of the wearable device accounts for the known orientation of an accompanying antenna module. In one embodiment, this fixed angle/orientation may be permanent while the wearable device is attached to the wristband, or in another embodiment, the fixed angle/orientation may be based on setting the antenna to an "operational position" (e.g., clicking in place once on the wrist of the user), such that the band may lay flat when not engaged with the user. Alternatively (or in addition), the antenna peripheral may include its own orientation determination circuitry, in which the orientation is relayed to the GUI above for aiming of the antenna, accordingly.

Figure 14:
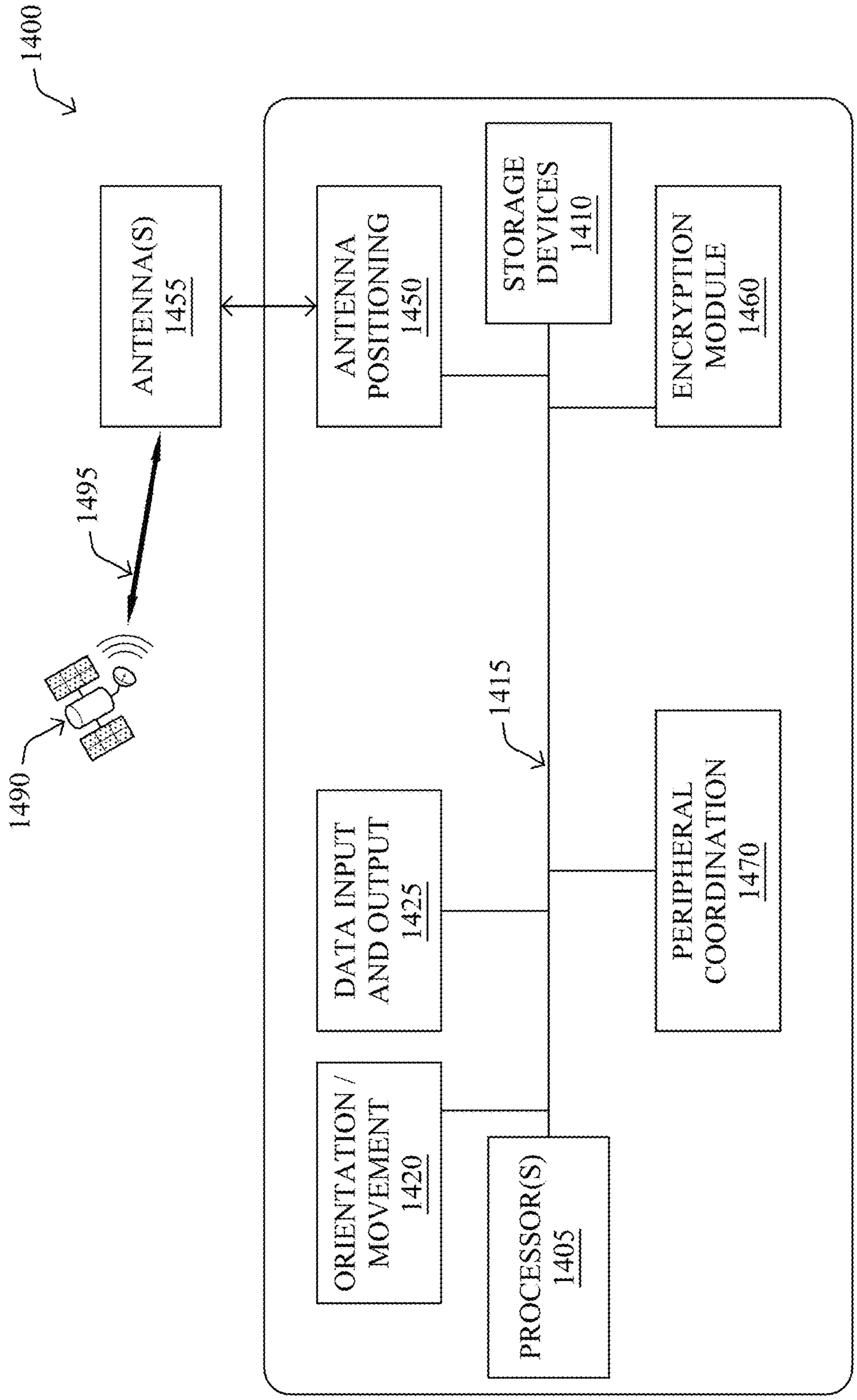
FIG. 14 illustrates an example simplified block diagram of a computing device in accordance with one or more embodiments described herein.

FIG. 14 is an example drawing of a modular computing device 1400 in accordance with one or more embodiments herein. In particular, the modular device 1400 may be embodied as a wearable device above (e.g., a smartwatch, fitness tracker, etc.), or, in certain embodiments, as a standalone device and/or a peripheral device. As shown, the device 1400 contains certain components, though certain components may be located within a peripheral that relays power and/or information to the wearable device connected via a link (e.g., wirelessly or through a signal bus). (Note that in one embodiment, the embodiments herein also provide for a singular satellite communication device without integration with a secondary wearable device: that is, the wearable device herein would thus be the satellite communication device as a standalone device.)

The operation of device 1400 is governed by the controller or processor(s) 1405. The control may be, and often is, governed by software modules residing in the memory of storage device 1410 or shown separately (e.g., hardware, software, firmware, or combinations thereof), where communication between the storage device, processor(s), and various modules is conducted over an internal communication bus 1415.

Various orientation and/or movement sensors 1420, such as gyros (gyroscopes), accelerometers, compasses, barometers, etc. may be used to determine general movement and orientation of the device 1400, such as angle to the earth, degrees to true north, acceleration in a particular direction, and so on, in order to roughly track the location of a wearable device as well as to track the aim of antennas associated with the device as described above.

Device 1400 may also include a data input/output (I/O) module 1425. The module 1425 on a wearable device may be any combination of a microphone for entering a voice message, a keyboard for entering a text message, and a video camera for entering a video message, and a network connection for entering any type of received data.

The antenna positioning module 1450 illustratively positions the antenna(s) 1455 in the direction of a particular satellite 1490, as described above for transmission and/or reception of signals 1495. Notably, as described above, a communication satellite antenna for a mobile device may be a directional, wide-lobed antenna, illustratively of a mobile-sized form factor (e.g., fitting on a wristband).

The operation of directing the antenna towards a satellite can be based on instructing the user of the device 1400 to point the antenna towards the satellite as described above, or any other method resulting in pointing the antenna towards the selected satellite. In accordance with one embodiment, the signals 1495 may be encrypted/decrypted using encryption module 1460, where the specific encryption mechanisms may be adjusted on-demand.

Other configurations of a computing device 1400 may be used in accordance with the techniques herein, and FIG. 14 is merely an example of one implementation. For instance, more or fewer modules may be included, and certain modules may be embodied as software processes within storage device 1410 for execution by the processor 1405. As such, any module and/or process described herein may generally be referred to as a process for execution by a processor. For instance, when the computing device is the wearable device, for example, certain computations may involve coordination between multiple computing devices (e.g., with processes/components of one or more peripheral devices), where the "process" comprises one or more coordinated components, accordingly, such as through peripheral coordination process 1470 (e.g., sending/receiving signals to/from the peripherals over the signal bus or wirelessly, such as via Bluetooth®, local WiFi, etc.).

Still further, it is expressly contemplated herein that one or more components may comprise flexible circuits, semi-rigid circuit boards, or other "formable" concepts or techniques to allow the wristband, peripherals, associated circuitry, wiring, and so on to comfortably conform to the wrist (or other location) of the user.

Advantageously, the techniques herein provide for extended power, circuitry, and/or communication capability for wrist-wearable electronic devices. In particular, the techniques herein extend the functionality of a wearable device, through the addition of one or more modular peripherals such as batteries, sensors, communication antennas, and so on. For instance, the specific embodiment of a wrist-borne satellite communicator, illustratively attached to a smartwatch (wired or wirelessly, or merely physically) offers multi-use benefits for enterprise and government consumers with remote (out of traditional communications range) workforce, as well as consumers who enjoy adventure travel to remote locations, providing real-time messaging and connectivity through assured satellite communications.

While there have been shown and described illustrative embodiments, it is to be understood that various other adaptations and modifications may be made within the scope of the embodiments herein. For example, the embodiments may, in fact, be used in a variety of types of wireless communication networks and/or protocols, and need not be limited to the illustrative satellite implementations. Furthermore, while the embodiments may have been demonstrated with respect to certain communication protocols, physical connectivity, or device form factors, other configurations may be conceived by those skilled in the art that would remain within the contemplated subject matter of the description above.

Additionally, while certain styles of wearable devices and associated wristbands may have been shown and/or described above, particularly smartwatches, any suitable wearable device and/or wristband may be used in accordance with the techniques and embodiments described above. Still other alternatives may also exist herein, as will be appreciated by those skilled in the art, such as ankle-worn devices, upper-arm-warn devices, and so on.

Moreover, it is worth pointing out again that although certain units, data types, procedures, and equations may have been described above, other similarly functional alternatives may be used within the scope of the present disclosure, where applicable. Furthermore, while various technologies may have been used as examples, such as types of batteries, types of antennas, types of circuitry, and so on, other such technologies, similar or otherwise, may be used in accordance with the embodiments herein.

Furthermore, in the detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Also, in one embodiment, an illustrative tangible, non-transitory, computer-readable medium according to one or more embodiments of the present disclosure may store program instructions that cause a computer (processing device) to execute a process described above.

According to one or more specific embodiments of the present disclosure, an example satellite communication wristband for a wrist-wearable smart device may comprise: a band configured to affix to a wrist of a wearer; a securing mechanism configured to secure the band to the wrist-wearable smart device; a satellite patch antenna integrated with the band and configured to communicate with one or more satellites on one or more satellite communication frequencies while on the wrist of the wearer; a battery integrated with the band; and a satellite communication module powered by the battery and configured to transmit and receive satellite communication messages with the one or more satellites via the satellite patch antenna, the satellite communication module further configured to communicate with the wrist-wearable smart device, wherein aiming of the satellite patch antenna and communication of two-way messages via the satellite communication module are managed based on a graphical user interface of the wrist-wearable smart device.

In one embodiment, a portion of the band passes beneath the wrist-wearable smart device, and wherein the battery is integrated with the portion of the band that passes beneath the wrist-wearable smart device. In one embodiment, the wristband further comprises: an inner aperture within the battery configured to permit one or more sensors of an underside of the wrist-wearable smart device to interface with skin of the wearer through the inner aperture of the battery. In one embodiment, the battery comprises two portions configured to mate and establish the inner aperture. In one embodiment, the wristband further comprises: an insert fitted within the inner aperture and having one or more sensory conveyors configured to extend capability of the one or more sensors to interface the skin of the wearer. In one embodiment, the battery is larger than the wrist-wearable smart device in at least one dimension.

In one embodiment, the battery is integrated within the band on one or on opposing ends of the wrist-wearable smart device.

In one embodiment, the battery comprises a plurality of batteries in a flexible arrangement within the band and configured to permit conforming of the band to the wrist of the wearer.

In one embodiment, the band comprises one of either: a) one elastic material band or b) two non-elastic band portions with a fastening mechanism.

In one embodiment, the satellite communication module comprises one or more components selected from a group consisting of: one or more flexible circuits; one or more semi-rigid circuit boards; and a plurality of rigid circuit boards interconnected by flexible connectors.

In one embodiment, the satellite communication module is configured to communicate with the wrist-wearable smart device via one of either a physical bus connection or a wireless communication protocol.

According to one or more additional specific embodiments of the present disclosure, an example circuitry-enhancing band for a wearable electronic device may comprise: a band configured to affix to a limb of a wearer, wherein the band comprises one of either: a) one elastic material band or b) two non-elastic band portions with a fastening mechanism; a securing mechanism configured to secure the band to the wearable electronic device; and one or more electronic peripheral components integrated with the band and configured to provide a corresponding configured capability to the wearable electronic device via one of either a physical connection or a wireless protocol with the wearable electronic device.

In one embodiment, the one or more electronic peripheral components comprise: a satellite patch antenna integrated with the band and configured to communicate with one or more satellites on one or more satellite communication frequencies while on a wrist of the wearer; a battery integrated with the band; and a satellite communication module powered by the battery and configured to transmit and receive satellite communication messages with the one or more satellites via the satellite patch antenna, the satellite communication module further configured to communicate with the wearable electronic device, wherein aiming of the satellite patch antenna and communication of two-way messages via the satellite communication module are managed based on a graphical user interface of the wearable electronic device.

In one embodiment, the one or more electronic peripheral components comprise a battery integrated with the band. In one embodiment, a portion of the band passes beneath the wearable electronic device, and wherein the battery is integrated with the portion of the band that passes beneath the wearable electronic device. In one embodiment, the band further comprises: an inner aperture within the battery configured to permit one or more sensors of an underside of the wearable electronic device to interface with skin of the wearer through the inner aperture of the battery. In one embodiment, the battery comprises two portions configured to mate and establish the inner aperture. In one embodiment, the band further comprises: an insert fitted within the inner aperture and having one or more sensory conveyors configured to extend capability of the one or more sensors to interface the skin of the wearer. In one embodiment, the battery is integrated within the band on one or on opposing ends of the wearable electronic device.

In one embodiment, the one or more electronic peripheral components comprise are selected from a group consisting of: one or more flexible circuits; one or more semi-rigid circuit boards; and a plurality of rigid circuit boards interconnected by flexible connectors.

Further, in other embodiments, an illustrative apparatus according to one or more embodiments of the present disclosure may comprise: a processor configured to execute one or more processes; a communication interface configured to communicate via one or more antennas (e.g., satellite antennas) associated with the apparatus; and a memory configured to store a process executable by the processor, the process, when executed, configured to perform a process described above.

As another non-limiting example, one illustrative apparatus may comprise: a wearable device configured to execute one or more processes; a wristband embedded signal bus configured to communicate electrical signals from attachable peripherals to a wearable device to extend the functionality of the wearable device; and a memory configured to store a process executable by the processor, the process, when executed, configured to perform one or more processes associated with the attachable peripherals. In one embodiment, the attachable peripheral is a battery and extending the functionality comprises extending the operational time of the device. In one embodiment, the attachable peripheral is an antenna and extending the functionality comprises one of improving the communication functionality of the wearable device and enabling the communication functionality of the device. In one embodiment, the attachable peripheral is a communication modem (receiver/transmitter) and extending the functionality comprises one of improving the communication functionality of the wearable device and enabling the communication functionality of the device. In one embodiment, the communication functionality of the wearable device includes communication over a satellite link. In one embodiment, the attachable peripheral is a sensor and extending the functionality comprises one of improving the functionality of the wearable device and enabling the functionality of the device to monitor the environment. In one embodiment, the attachable peripheral is a processor. In one embodiment, the battery is a ring shape and the aperture battery is utilized to facilitate communication of biometric signals from the user to the wearable device.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A satellite communication wristband for a wrist-wearable smart device, the satellite communication wristband comprising:

a band configured to affix to a wrist of a wearer;

a securing mechanism configured to secure the band to the wrist-wearable smart device;

a satellite patch antenna integrated with the band and configured to communicate with one or more satellites on one or more satellite communication frequencies while on the wrist of the wearer;

a battery integrated with the band; and a satellite communication module powered by the battery and configured to transmit and receive satellite communication messages with the one or more satellites via the satellite patch antenna, the satellite communication module further configured to communicate with the wrist-wearable smart device, wherein aiming of the satellite patch antenna and communication of two-way messages via the satellite communication module are managed based on a graphical user interface of the wrist-wearable smart device.

2. The satellite communication wristband as in claim 1, wherein a portion of the band passes beneath the wrist-wearable smart device, and wherein the battery is integrated with the portion of the band that passes beneath the wrist-wearable smart device.

3. The satellite communication wristband as in claim 2, further comprising:

an inner aperture within the battery configured to permit one or more sensors of an underside of the wrist-wearable smart device to interface with skin of the wearer through the inner aperture of the battery.

4. The satellite communication wristband as in claim 3, wherein the battery comprises two portions configured to mate and establish the inner aperture.

5. The satellite communication wristband as in claim 3, further comprising:

an insert fitted within the inner aperture and having one or more sensory conveyors configured to extend capability of the one or more sensors to interface the skin of the wearer.

6. The satellite communication wristband as in claim 2, wherein the battery is larger than the wrist-wearable smart device in at least one dimension.

7. The satellite communication wristband as in claim 1, wherein the battery is integrated within the band on one or on opposing ends of the wrist-wearable smart device.

8. The satellite communication wristband as in claim 1, wherein the battery comprises a plurality of batteries in a flexible arrangement within the band and configured to permit conforming of the band to the wrist of the wearer.

9. The satellite communication wristband as in claim 1, wherein the band comprises one of either: a) one elastic material band or b) two non-elastic band portions with a fastening mechanism.

10. The satellite communication wristband as in claim 1, wherein the satellite communication module comprises one or more components selected from a group consisting of: one or more flexible circuits; one or more semi-rigid circuit boards; and a plurality of rigid circuit boards interconnected by flexible connectors.

11. The satellite communication wristband as in claim 1, wherein the satellite communication module is configured to communicate with the wrist-wearable smart device via one of either a physical bus connection or a wireless communication protocol.

12. A circuitry-enhancing band for a wearable electronic device, the circuitry-enhancing band comprising:

a band configured to affix to a limb of a wearer, wherein the band comprises one of either: a) one elastic material band or b) two non-elastic band portions with a fastening mechanism;

a securing mechanism configured to secure the band to the wearable electronic device; and one or more electronic peripheral components integrated with the band and configured to provide a corresponding configured capability to the wearable electronic device via one of either a physical connection or a wireless protocol with the wearable electronic device, wherein the one or more electronic peripheral components comprise:

a satellite patch antenna integrated with the band and configured to communicate with one or more satellites on one or more satellite communication frequencies while on a wrist of the wearer;

a battery integrated with the band; and a satellite communication module powered by the battery and configured to transmit and receive satellite communication messages with the one or more satellites via the satellite patch antenna, the satellite communication module further configured to communicate with the wearable electronic device, wherein aiming of the satellite patch antenna and communication of two-way messages via the satellite communication module are managed based on a graphical user interface of the wearable electronic device.

13. A circuitry-enhancing band for a wearable electronic device, the circuitry-enhancing band comprising:

a band configured to affix to a limb of a wearer, wherein the band comprises one of either: a) one elastic material band or b) two non-elastic band portions with a fastening mechanism;

a securing mechanism configured to secure the band to the wearable electronic device; and a battery integrated with the band and configured to provide battery power to the wearable electronic device via a physical connection or a wireless protocol with the wearable electronic device, wherein a portion of the band passes beneath the wearable electronic device, and wherein the battery is integrated with the portion of the band that passes beneath the wearable electronic device.

14. A circuitry-enhancing band for a wearable electronic device, the circuitry-enhancing band comprising:

a band configured to affix to a limb of a wearer, wherein the band comprises one of either: a) one elastic material band or b) two non-elastic band portions with a fastening mechanism;

a securing mechanism configured to secure the band to the wearable electronic device;

a battery integrated with the band and configured to provide battery power to the wearable electronic device via a physical connection or a wireless protocol with the wearable electronic device; and an inner aperture within the battery configured to permit one or more sensors of an underside of the wearable electronic device to interface with skin of the wearer through the inner aperture of the battery.

15. The circuitry-enhancing band as in claim 14, wherein the battery comprises two portions configured to mate and establish the inner aperture.

16. The circuitry-enhancing band as in claim 14, further comprising:

an insert fitted within the inner aperture and having one or more sensory conveyors configured to extend capability of the one or more sensors to interface the skin of the wearer.

* * * * *